United States Patent [19]

Britz

[11] Patent Number: 5,519,343

[45] Date of Patent: May 21, 1996

[54] TWO CHANNEL DIRECT DIGITAL SYNTHESIZER WITH WAVEFORM MEMORY INTERLEAVING CIRCUIT

[75] Inventor: William J. Britz, Snohomish, Wash.

[73] Assignee: Fluke Corporation, Everett, Wash.

[21] Appl. No.: 500,226

[22] Filed: Jul. 10, 1995

[51] Int. Cl.$^6$ .................................................. H03B 21/00
[52] U.S. Cl. ........................................... 327/106; 327/105
[58] Field of Search ..................................... 327/105, 106, 327/107, 231, 237, 243, 248, 249, 258

[56] References Cited

U.S. PATENT DOCUMENTS

| | | | |
|---|---|---|---|
| 3,973,209 | 8/1976 | Nossen et al. | 327/105 |
| 4,992,743 | 2/1991 | Sheffer | 328/14 |
| 4,998,072 | 3/1991 | Sheffer | 327/106 |
| 5,126,960 | 6/1992 | Thong | 364/721 |
| 5,263,191 | 11/1993 | Dickerson | 327/105 |
| 5,371,765 | 12/1994 | Guilford | 327/107 |
| 5,428,308 | 7/1995 | Maeda | 327/106 |
| 5,436,600 | 7/1995 | Van Heteren et al. | 327/105 |
| 5,467,294 | 11/1995 | Hu et al. | 327/106 |
| 5,469,479 | 11/1995 | Chang et al. | 375/377 |

*Primary Examiner*—Toan Tran

[57] ABSTRACT

A two channel direct digital synthesis circuit employing a waveform interleaving circuit is provided. A clock having first and second states controls the overall operation of the memory interleave operation. A phase accumulator is incremented by a phase increment value according to a clock rate. The phase accumulator value is provided to a first multiplexer and to an offset adder where the first multiplexer selects between the phase accumulator value and the sum of the phase accumulator value and a phase offset value. First and second waveform select signals are provided to the inputs of a second multiplexer where the second multiplexer selects between the first and second waveform select signals. The outputs of the first and second multiplexers form an address which is coupled to a waveform memory containing first and second digital waveform patterns. Digital waveform data according to the first and second digital waveform patterns from the waveform memory is provided to first and second latches which store the data responsive to the first and second waveform select signals. The digital waveform data from the first and second latches are provided to first and second digital to analog converters to produce first and second output waveforms which have a phase offset according to the phase offset value.

3 Claims, 3 Drawing Sheets

TWO CHANNEL DIRECT DIGITAL SYNTHESIZER WITH WAVEFORM MEMORY INTERLEAVING CIRCUIT

BACKGROUND OF THE INVENTION

This invention relates generally to direct digital synthesis circuits and in particular to direct digital synthesis circuits which produce multiple output signals with selectable phase offset between the signals.

Direct digital synthesis (DDS) is a technique by which waveforms stored as digital waveform patterns in a waveform memory are reproduced as output signals using a digital to analog converter (DAC). A phase accumulator consisting of a digital register and adder contains a phase accumulator value which is incremented at a dock rate with a selectable phase increment, thereby determining the output frequency of the output signal. Phase accumulators can be constructed from inexpensive digital adders and latches to obtain a relatively large number of available bits to obtain precise control over the frequency of the output signal. The higher order bits (most significant bits) from the phase accumulator are provided as a series of addresses to the waveform memory which in turn provides digital waveform data to the DAC according to digital waveform patterns stored in the waveform memory. The DAC in turn produces the output signal from the digital waveform data.

It is often desirable to add additional output signals which are reproduced synchronously with the first output signal, with each additional output signal having a selectable phase offset from the first output signal. DDS technology has been adapted to provide multiple, synchronized waveforms with selectable phase offsets. FIG. 1A and 1B illustrate the relationship between two synchronous output signals with a selectable phase offset created by a two-channel DDS synthesizer circuit. FIG. 1A is a graph of waveform 10 which represents an output signal from channel 2 of a two-channel DDS synthesizer circuit. FIG. 1B is a graph of waveform 20 which represents an output signal from channel 1 of the two-channel DDS synthesizer. The waveforms 10 and 20 can be the same or different wave shapes based on the digital waveform patterns stored in the waveform memory but each waveform is related by having the same number of digital waveform values in its digital waveform pattern. The period for one cycle of the digital waveform pattern is the time difference t3 −t1 for waveform 10 which equals the period for one cycle of the waveform 20 which is t2−t0. The phase offset may be measured as a time difference, in this case as the time t1−t0, or as a fraction of the period, measured in degrees.

Two-channel DDS synthesizers that are capable of generating waveforms with selectable phase offset are known in the art. The second channel is typically obtained by adding a second parallel DDS synthesizer alongside the first DDS synthesizer and coupling a common clock signal to each synthesizer and then entering a predetermined phase offset value into one of the phase accumulators. Because the phase accumulator values are continually incremented by the same phase increment value according to the same clock signal, the desired phase offset between the two output signals from the first and second channels is maintained.

FIG. 2 is a simplified block diagram of a two-channel DDS synthesizer circuit according to the prior art. ADDS synthesizer 100 produces an output signal which may take the form of waveform 20 (shown in FIG. 1). A phase accumulator 110 is constructed from a phase adder 120 which has an output A+B coupled to a latch 130 via a parallel data path. The latch 130 has an output D coupled to an input A of the accumulator 110 via a second parallel data path. In the preferred embodiment, each of the parallel data paths in the phase accumulator is 28 bits wide. Wider data paths may be readily employed where a greater amount of frequency precision in the output signal is required. A phase increment value 140 is obtained from a microcontroller (not shown) and is coupled to an input B of the phase accumulator 120 to control the output frequency of the output signal 20.

A clock signal 125 is coupled to a clock input CLK on the latch 130 to determine the rate at which the phase increment value 140 is added to the present contents of the phase accumulator, represented by a phase accumulator value. The rate of the clock signal 125 and the value of the phase increment value 140 determine the rate at which the values in the phase accumulator value is incremented. One cycle of the output waveform 20 is complete when the phase accumulator value stored in the phase accumulator 110 reaches its maximum value. As the phase accumulator value exceeds the maximum capacity of the phase accumulator 110, the phase accumulator 110 "wraps around" back through its zero value to continue into a new cycle of the output waveform 20. In this way, the waveforms 10 and 20 may be reproduced as continuous waveforms and with the desired phase offset between the waveforms 10 and 20 continuously maintained.

The most significant bits from the phase accumulator 110 are coupled to an address input of a waveform random access memory (RAM) 150. In this way, the memory locations of the waveform RAM 150 are sequentially accessed at a sample rate which is determined by the rate of the clock signal 125, phase increment value 140, and the number of bits of the phase accumulator 110. A data output from the waveform RAM 150 is coupled to a DAC 160 which converts the digital waveform data to analog voltage values at the sample rate to produce the output signal.

A second DDS synthesizer channel is implemented using a second, parallel DDS synthesizer 200 which functions in a manner substantially similar to that of the DDS synthesizer 100. DDS synthesizers 100 and 200 share the clock signal 125. A phase offset value 210 is coupled to a preset input of the latch 130 which is added to the phase accumulator value stored in the phase accumulator 130 to obtain an address value for the waveform RAM which contains the desired phase offset from the phase accumulator value stored in the phase accumulator 230. Alternatively, the phase offset 210 could be coupled to a preset input of the latch 250 instead of the latch 130 to obtained the desired phase offset. The phase offset value 210 is obtained from a microcontroller (not shown) but is generally controllable to obtain a desired phase offset. The phase increment value 140 is coupled to both adders 120 and 260. The waveform data from the waveform RAM 240 are coupled to a DAC 270 to produce the waveform 10 with the phase offset as shown in FIG. 1A.

The phase accumulators 110 and 230 and waveform RAM 150 and 240 are substantially identical and perform the same function for each channel between the two DDS synthesizers 100 and 200. Care must be taken to synchronize the two phase accumulators to the desired starting points to obtain the desired phase offset. If a new phase offset is desired, it is necessary to first synchronize the two phase accumulators by entering a zero reset value in of the latches 130 and 250, and then entering a new phase offset value at the preset input of the latch 130, thus interrupting the output signals during the change. Therefore, it would be desirable to provide a two-channel DDS synthesizer employing a waveform interleaving circuit which requires a single phase accumulator and a single waveform RAM. It would be further desirable to have at least two waveform patterns contained in the waveform RAM which may be selected for either channel and to have the capability of adjusting the phase offset with no interruption of the output signal.

SUMMARY OF THE INVENTION

In accordance with the present invention, a two-channel DDS synthesizer circuit employing a waveform memory interleaving circuit is provided. The output of a phase accumulator is coupled to an input of a multiplexer and to an input of an offset adder. The multiplexer alternatively selects between the output of the phase accumulator and an output of the offset adder, which adds a phase offset value to the value of the phase accumulator. A second multiplexer alternatively selects between two waveform select lines, one line selects between two waveforms for the first output channel and the other line selects between the same two waveforms for the second output channel. A clock signal with two states controls the timing of the memory interleaving operation.

The outputs of the first and second multiplexers are coupled to a single waveform memory which contains the digital patterns of the first and second waveforms. The output of the second multiplexer is used to select between the two waveforms for the first and second channels. The output of the waveform memory is coupled to the inputs of two latches, with accept the digital waveform values for each of the two output ADC's. The waveform memory and the phase accumulator circuit are the most expensive components and only one of each is required for the present invention to obtain two output channels. The waveform interleaving operation is dependent on the timing provided by the clock signal 125 which has two states to synchronize the operation of the phase accumulator with operation of the two multiplexers and with the two latches which function as demultiplexers. Each of the two channels can select between either of the two waveforms stored in the waveform memory, which are reproduced with selectable phase offset according to the phase offset value.

One object of the present invention is to provide a two channel DDS synthesizer with waveform memory interleaving.

Another object of the present invention is to provide a two channel DDS synthesizer with waveform memory interleaving allowing instantaneous adjustment of the phase offset between the two channels.

An additional object of the present invention is to provide two channel DDS synthesizer with waveform memory interleaving which allows either channel to select from at least two waveforms stored in the waveform memory with selectable phase offset.

A further object of the present invention is to provide a two channel DDS synthesizer with reduced component count and cost.

Other features, attainments, and advantages will become apparent to those skilled in the art upon a reading of the following description when taken in conjunction with the accompanying drawings.

DETAILED DESCRIPTION OF THE INVENTION

Figure 1A:
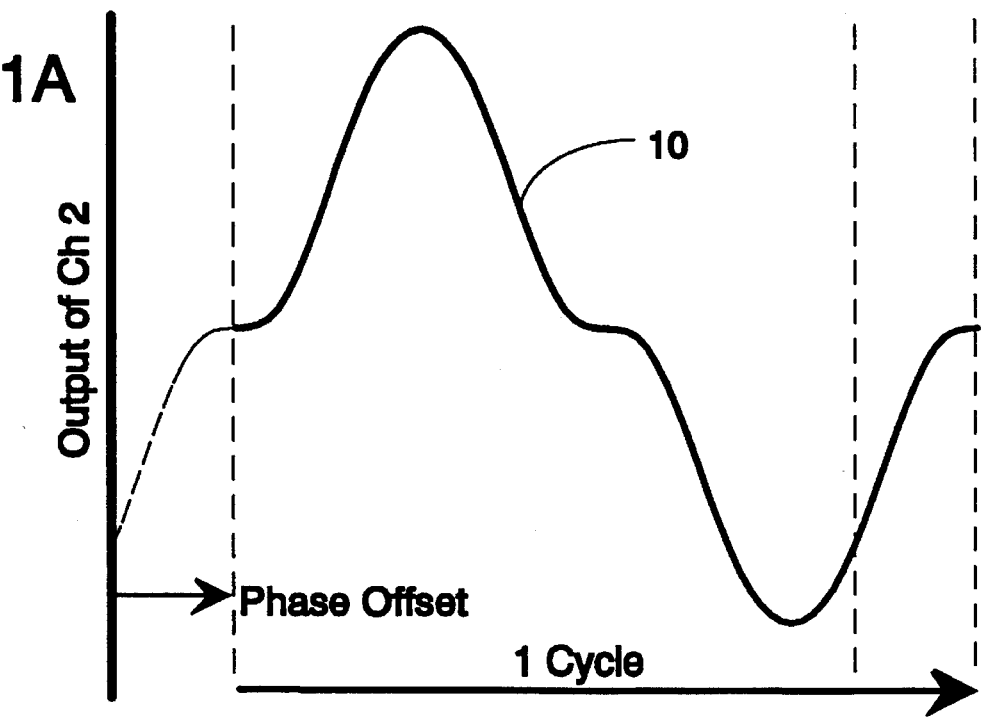
FIG. 1A and 1B together illustrate the relationship between two synchronous output signals with selectable phase offset created by a two-channel DDS synthesizer circuit.
Figure 1B:
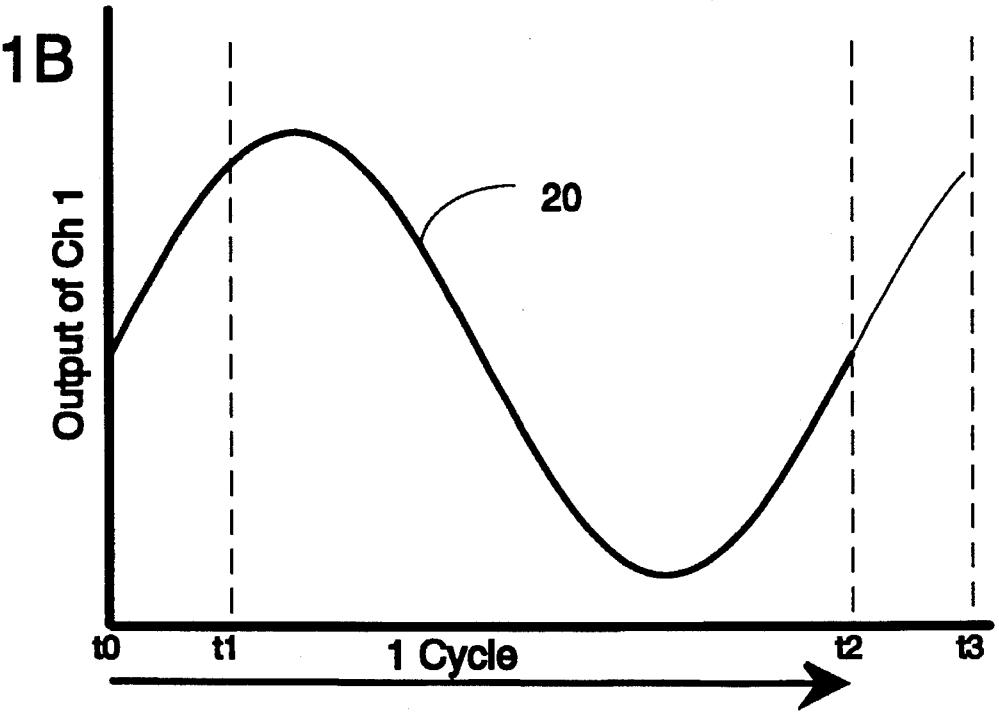
Figure 2:
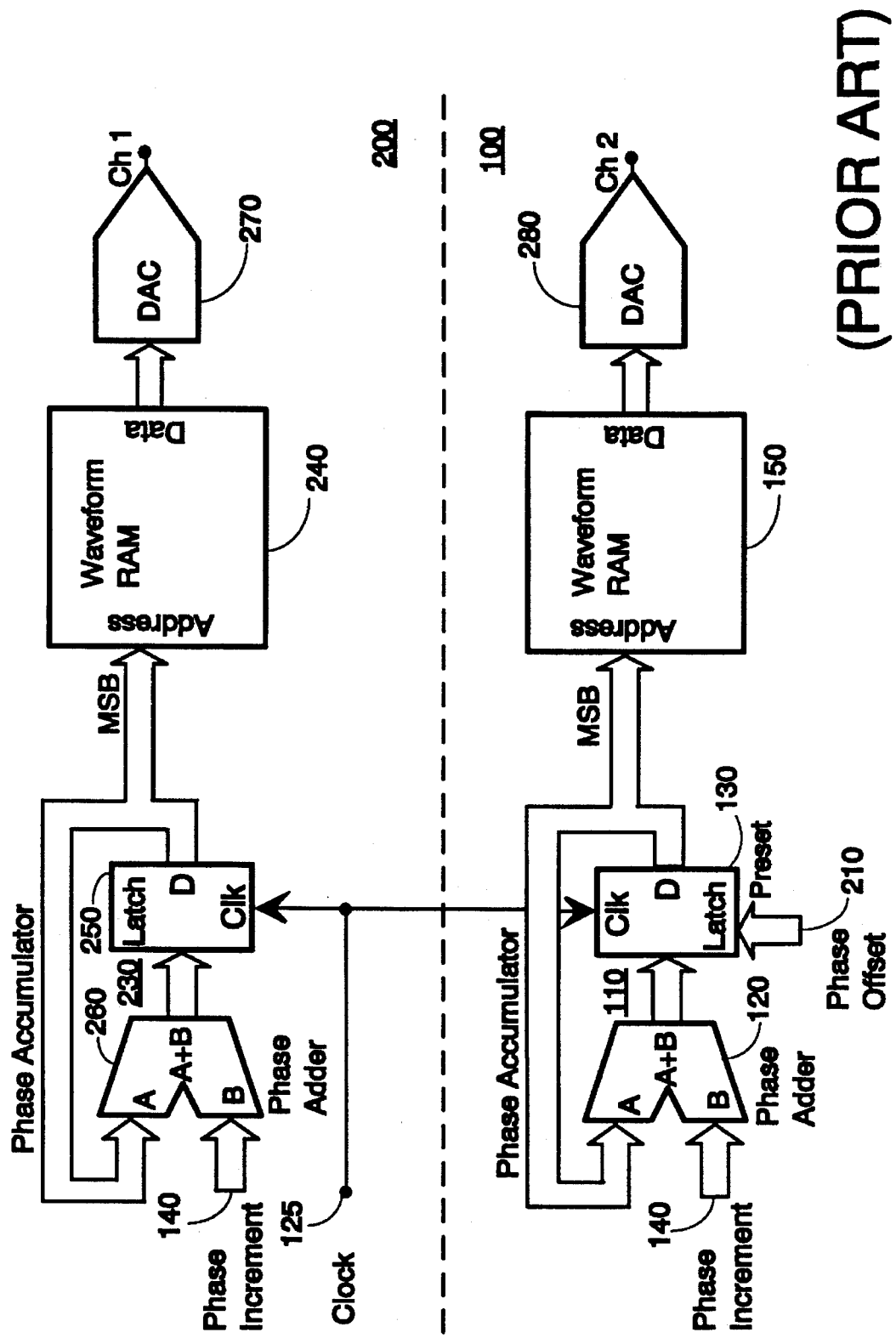
FIG. 2 is a simplified block diagram of a two channel DDS synthesizer circuit according to the prior art.
Figure 3:
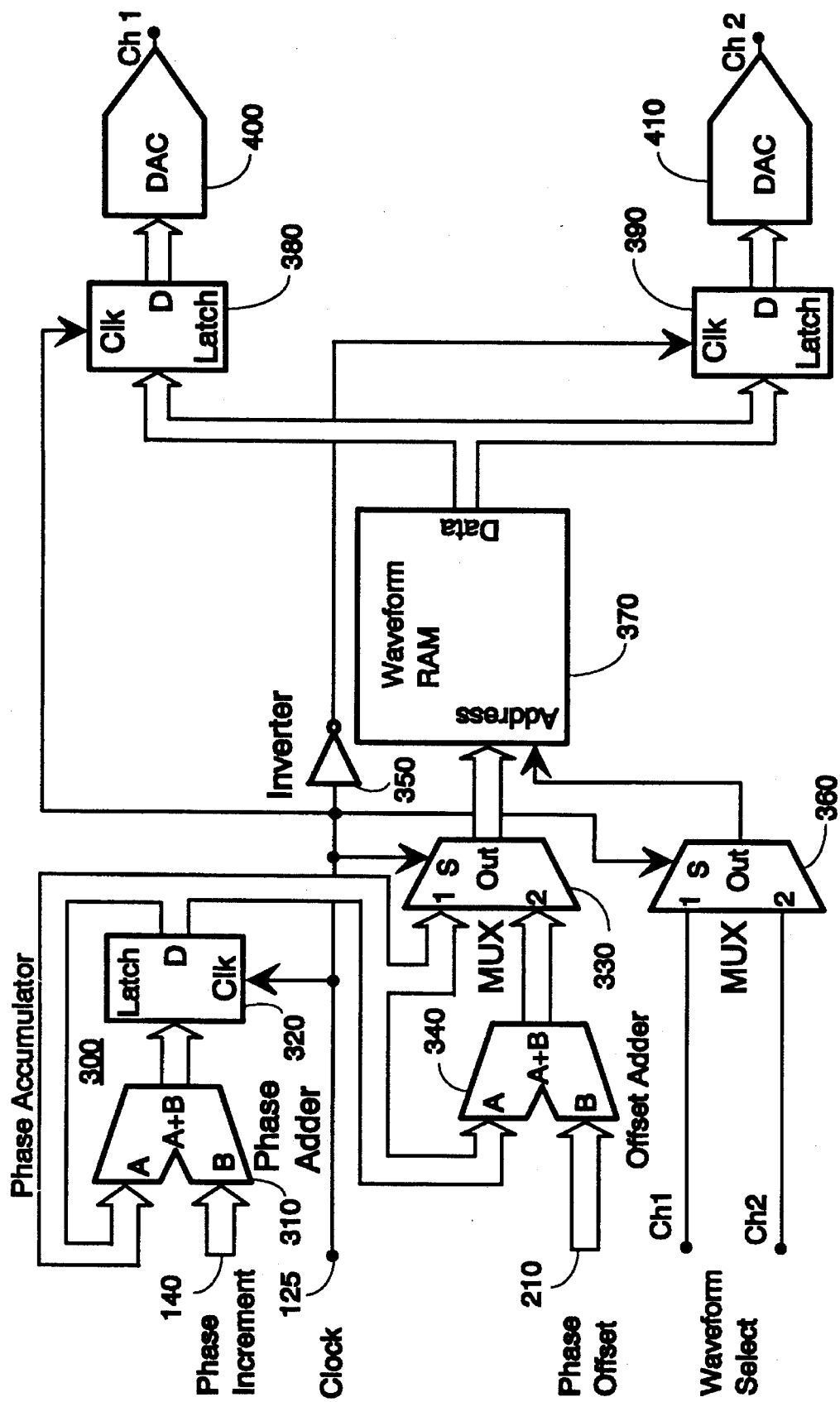
FIG. 3 is a simplified block diagram of a two channel DDS synthesizer circuit according to the present invention.

FIG. 3 is a simplified block diagram of a two-channel DDS synthesizer circuit according to the present invention. A phase accumulator 300 is constructed from an adder 310 with an output coupled to a latch 320 via a parallel data path. An output of the latch 320 is coupled to an A input of the adder 310. The phase increment value 140 (shown in FIG. 2) is coupled to a B input of the adder 310.

The clock signal 125 has two distinct states, for example, logical high and low, which are used to control the timing of the waveform interleave operation. A first clock state is associated with the first channel and a second clock state associated with the second channel. The time periods of the first and second states are substantially equal. The devices coupled to the clock signal 125 for synchronization may be selected to trigger on the transitions between the two states ("edge triggered") or respond asynchronously ("level sensitive") as appropriate. The clock signal 125 is coupled to an inverter 350 that produces an inverted clock signal so that the devices may properly trigger on the first or second states as desired.

The clock signal 125 is coupled to a clock input of the latch 320 which determines the rate at which the phase increment value 140 is added to the contents of the latch 320. The output of the latch 320 is further coupled to a first input of a multiplexer 330 and to an A input of an offset adder 340. An offset output of the offset adder 340 is coupled to a second input of the multiplexer 330. The phase offset value 210 is coupled to a B input of the offset adder 340. The offset adder 340 produces the mathematical sum of the values present at the A and B inputs at the offset output. The multiplexer 330 has a select input S which is coupled to the clock signal 125 such that the multiplexer 330 selects between the first and second input when the clock signal 125 is in its first state and second states respectively. The phase accumulator value is present at the first input and the sum of the phase accumulator value and the phase offset value is present at the second input.

A multiplexer 360 with a first input coupled to receive a first waveform select signal for a first output channel and a second input coupled to receive a second waveform select signal for a second output channel. The multiplexer 360 has a select input S which is coupled to the clock signal 125 such that the multiplexer 360 selects between the fast and second input which contain the first and second waveform select signals responsive to the first and second states of the clock signal 125.

An output of each of the multiplexers 330 and 360 is coupled to an address input of a waveform RAM 370. In the preferred embodiment, the waveform RAM 150 has 32,768 ($2^{15}$) memory locations, which corresponds to an address bus which is 15 bits wide. The 14 most significant bits from the 28 bit wide accumulator parallel data path are coupled to the address input of the memory RAM 150 via the multiplexer 330 to sequentially access each memory location. The waveform RAM 370 contains at least two separate waveform patterns, with a first waveform pattern in low memory, meaning that the 15th bit, the most significant bit (MSB), is a digital zero and a second waveform pattern in high memory, meaning that the MSB is digital one. The output of multiplexer 360 is coupled to the MSB of the address input of the waveform RAM 370 and the output of multiplexer 330 is coupled to the remaining address lines. Responsive to the state of the clock signal 125, the address formed by the multiplexers 330 and 360 is relevant for either the first or the second output channel. In the first state of the output clock signal 125, the address formed consists of the most significant bits of the phase accumulator value and the first waveform select signal, which may be digital one or zero, to select between the first or the second waveform pattern. In a second state of the output clock signal 125, the address formed consists of the most significant bits of the phase accumulator value plus the phase offset value 210 and the second waveform select signal, which may be digital one or zero, to select between the first or the second waveform pattern.

In an alternative embodiment, waveform interleaving may also be performed in a reduced-functionality version of a two channel DDS synthesizer where only one waveform pattern is desired between two channels. For example, if it were desired to have sine waves such as the waveform 20 from both channels but interleaved with a selectable phase offset, only one waveform pattern pertaining to sine waves need be stored in the waveform RAM 370. Furthermore, the multiplexer 360 and the waveform select lines could thereby be eliminated from the block diagram of FIG. 3 while still performing waveform interleaving according to the present invention.

A data output of the waveform RAM 370 is coupled to a latch 380 and to a latch 390. Latch 380 has a clock input coupled to the clock signal 125 and the latch 390 has a clock input coupled to the inverted clock signal such that the data received from the waveform RAM 370 is stored by latch 380 on the first state of the inverted clock signal and by latch 390 on the second state of the inverted clock signal. In this way, the latches 380 and 390 together function as a de-multiplexers in order to route the waveform data to the associated channel. The latches 380 and 390 are thus synchronized according to the clock signal 125 to store only the waveform data values corresponding to the waveform patterns selected for the first and second channels respectively. Latch 380 is coupled to a DAC 400 and latch 390 is coupled to a DAC 410 which produce the waveforms 10 and 20.

In the two-channel DDS synthesizer circuit according to the present invention, the user may select from either of two waveform patterns and instantly change between either waveform patterns selected for the first and second channels as well as the phase offset value 210. Because the phase offset value 210 is used to calculate the phase offset for each address, changes in the phase offset value 210 will be reflected in the next cycle of the clock signal 125, allowing a high degree of control by the operator without interrupting the output signals during phase offset changes. Because only one phase accumulator 300 is needed, there is no concern in maintaining phase synchronization between the first and second channels.

It will also be noted that because the latches 380 and 390 receive the digital waveform values skewed by one state of clock signal 125, it may be desirable to add a delay element corresponding to the one state of the clock signal 125 to one channel so that each channel may line up with the other with no time skew. This additional de-skewing element is not shown in the FIG. 3.

It will be obvious to those having ordinary skill in the art that many changes may be made in the details of the above described preferred embodiments of the invention without departing from the spirit of the invention in its broader aspects. For example, the waveform interleaving architecture may be extended for additional channels by adding multiplexers and latches but would require more complex clock signals to maintain timing between channels. The waveform patterns may be interleaved in different ways such as using the least significant bit (LSB) in the waveform RAM to select the waveform pattern with no loss of functionality. Therefore, the scope of the present invention should be determined by the following claims.

What I claim as my invention is:

1. A two channel direct digital synthesis circuit, comprising:

(a) a phase accumulator, coupled to a clock signal having first and second states, for incrementing a phase accumulator value by a phase increment value responsive to one of said first and second states;

(b) an offset adder adapted for receiving a phase offset value and coupled to said phase accumulator to produce a sum of said phase offset value and said phase accumulator value at an output;

(c) a multiplexer coupled to said phase accumulator to receive said phase accumulator value, to said offset adder output to receive said sum, and to said clock signal, said multiplexer coupling one of said phase accumulator value and said sum to a multiplexer output responsive to said first and second states;

(d) a waveform RAM having an address input and a data output, said waveform RAM storing at least one waveform pattern and said address input coupled to said multiplexer to select a waveform data value from said waveform pattern;

(e) first and second latches coupled to said data output for receiving said waveform data values and further coupled to said clock signal, said first latch storing said waveform data values responsive to said first state and said second latch storing said waveform data values responsive to said second state; and (f) first and second digital to analog converters coupled to said first and said second latches, respectively, for receiving said waveform data values from said first and second latches to produce first and second output signals with a selectable phase offset according to said phase offset value.

2. A two channel direct digital synthesis circuit according to claim 1, further comprising a second multiplexer coupled to first and second waveform select signals and to said clock signal, said second multiplexer coupling one of said first and second waveform select signals to said address input of said waveform RAM responsive to said first and second states wherein:

a plurality of waveform patterns are stored in said waveform memory, and said first and second latches each store only waveform data values corresponding to one of said waveform patterns selected by said first and said second waveform select signals.

3. A two channel direct digital synthesis circuit, comprising:

(a) a phase accumulator coupled to a clock signal having a first and second states, said phase accumulator incrementing a phase accumulator value by a phase increment value responsive to one of said first and second states;

(b) an offset adder adapted for receiving a phase offset value and coupled to said phase accumulator to produce a sum of said phase offset value and said phase accumulator value at an output;

(c) a first multiplexer coupled to said phase accumulator to receive said phase accumulator value, to said offset adder output to receive said sum, and to said clock signal, said first multiplexer coupling one of said phase accumulator value and said sum to a first multiplexer output responsive to said first and second states;

(d) a second multiplexer coupled to first and second waveform select signals and to said clock signal, said second multiplexer coupling one of said first and second wave form select signals to a second multiplexer output responsive to said first and second states;

(e) a waveform RAM having an address input and a data output for storing a first and a second waveform pattern, said address input coupled to said first and second multiplexer outputs to select a waveform data value from one of said first and said second waveform patterns;

(f) first and second latches coupled to said data output for receiving said waveform data values and further coupled to said clock signal, said first latch storing said waveform data values responsive to said first state and said second latch storing said waveform data values responsive to said second state, wherein said first and second latches each store only waveform data values corresponding to said waveform patterns selected by said first and said second waveform select signals; and (g) first and second digital to analog converters each coupled to one of said first and second latches for receiving said waveform data values to produce first and second output signals.

* * * * *